(12) United States Patent
Husgen et al.

(10) Patent No.: US 11,071,304 B2
(45) Date of Patent: Jul. 27, 2021

(54) METHOD AND COMPOSITION FOR PREPARING CURED MEAT PRODUCTS

(71) Applicant: Kerry Luxembourg S.a.r.l., Luxembourg (LU)

(72) Inventors: Ann Husgen, Rochester, MN (US); Ken Bauman, Rochester, MN (US); Lacey McKlem, Elgin, IL (US); Petri Papinaho, Spicer, MN (US); Beth Jones, Rochester, MN (US)

(73) Assignee: Kerry Luxembourg S.a.r.l., Luxembourg (LU)

( * ) Notice: Subject to any disclaimer, the term of this patent is extended or adjusted under 35 U.S.C. 154(b) by 0 days.

(21) Appl. No.: 14/269,455

(22) Filed: May 5, 2014

(65) Prior Publication Data

US 2014/0242217 A1    Aug. 28, 2014

Related U.S. Application Data

(62) Division of application No. 12/119,990, filed on May 13, 2008.

(60) Provisional application No. 60/943,163, filed on Jun. 11, 2007.

(51) Int. Cl.
| | |
|---|---|
| *A23B 4/22* | (2006.01) |
| *A23B 4/20* | (2006.01) |
| *A23B 4/24* | (2006.01) |
| *A23L 13/70* | (2016.01) |
| *A23L 13/40* | (2016.01) |
| *A23L 13/00* | (2016.01) |
| *A23L 13/60* | (2016.01) |

(52) U.S. Cl.
CPC .............. *A23B 4/22* (2013.01); *A23B 4/20* (2013.01); *A23B 4/24* (2013.01); *A23L 13/03* (2016.08); *A23L 13/428* (2016.08); *A23L 13/60* (2016.08); *A23L 13/72* (2016.08); *A23L 13/74* (2016.08)

(58) Field of Classification Search
None
See application file for complete search history.

(56) References Cited

U.S. PATENT DOCUMENTS

| | | |
|---|---|---|
| 1,685,629 A | 9/1928 | Drake |
| 4,013,797 A | 3/1977 | Gryczka |
| 4,113,885 A | 9/1978 | Zyss |
| 4,315,946 A | 2/1982 | Greiner et al. |
| 4,490,396 A | 12/1984 | Hsu et al. |
| 4,806,373 A | 2/1989 | Stumpf et al. |
| 5,192,565 A * | 3/1993 | Buhler ................ A23B 7/0053 426/49 |
| 5,731,018 A | 3/1998 | Janda et al. |
| 5,980,890 A | 11/1999 | Dong et al. |
| 5,981,260 A | 11/1999 | Metz |
| 6,217,925 B1 | 4/2001 | Kim |
| 6,689,403 B1 | 2/2004 | Gehring et al. |
| 2003/0091694 A1* | 5/2003 | Remo ................ A23L 11/09 426/52 |
| 2007/0141228 A1 | 6/2007 | Korleski |

FOREIGN PATENT DOCUMENTS

| | | |
|---|---|---|
| BE | 1014557 A6 | 12/2003 |
| CA | 2 367 598 A1 | 10/2000 |
| CN | 101795572 B | 1/2014 |
| DE | 102006050386 A1 | 4/2008 |
| EP | 0 515 721 A1 | 12/1992 |
| EP | 0 805 205 A1 | 11/1997 |
| GB | 1 353 008 | 5/1974 |
| JP | S48 082054 A | 11/1973 |
| JP | 2001 352935 | 12/2001 |
| WO | WO 00/57728 A1 | 10/2000 |
| WO | WO 2005/013703 A1 | 2/2005 |
| WO | 2008154536 A1 | 12/2008 |

OTHER PUBLICATIONS

Ko et al. "Effect of Incubation Conditions on the Reduction of Nitrate to Nitrite by Micrococcus roseus and *Escherichia coli* O157:H7" Journal of Food and Drug Analysis 2003 vol. 11 No. 2 pp. 164-170.*
Smith et al. Journal of Applied Bacteriology "Reduction of Nitrate in a meat System by Lactobacillus plantarum" 1978 vol. 45 pp. 153-155.*
Pöhnl et al. (WO 2005013703 WIPO Patentscope utilizing Google Translation) 13 pages.*
Kurihara et al. "Production Method of Vegetable Extract or Powder thereof, which have a Coloring Effect" JP-A-S48-082054 (English Translation) pp. 1-14.*
Stewart et al. "Periplasmic Nitrate Reductase (Nap ABC Enzyme) Supports Anaerobic Respiration by *Escherichia coli* K-12" Mar. 2002 Journal of Bacteriology vol. 184 No. 5 pp. 1314-1323.*
Pohnl (WO 2005/013703) Machine Translation 8 pages (Year: 2005).*
Cammack et al. "Nitrite and nitrosyl compounds in food preservation" Biochimica et Biophysica Acta 1411 pp. 475-488 (Year: 1999).*
Walker, Ronald, "Naturally Occurring Nitrate/Nitrite in Foods", 1975, Journal of the Science of Food Agriculture, vol. 26, pp. 1735-1742.
Bickers, GA; Bäwald, G., Fermentative Ein Flüsse auf die Nitratgehalte in Gemüse-Trünken, Die Industrielle Obst-und Gemüseverwertung, Nov. 1994, pp. 395-399 (English translation attached).
Sebranek et al., "Natural and Organic Cured Meat Products: Regulatory, Manufacturing, Marketing, Quality, and Safety Issues", Mar. 2007 (American Meat Science Association White Paper Series No. 1; pp. 1-15.
Rosypal et al., "The Classification of Micrococci and Staphylococci Based on their DNA Base Composition and Adanonian Analysis" (J. Gen. Microbiology 1966 vol. 44; pp. 281-292.

(Continued)

*Primary Examiner* — Felicia C Turner
(74) *Attorney, Agent, or Firm* — Sughrue Mion, PLLC

(57) ABSTRACT

The invention provides a curing agent comprising a plant-based nitrite derived from plant material comprising nitrate and a process for preparing the curing agent comprising contacting a plant material with an organism capable of converting nitrate to nitrite. The curing agent can be used to preserve or cure meat or meat products.

5 Claims, No Drawings

(56) References Cited

OTHER PUBLICATIONS

Casaburi et al., "Technological activities of *Staphylococcus carnosus* and *Staphylococcus simulans* strains isolated from Fermented Sausages," 2005 Meat Science 71; pp. 643-650.
Matsubara, "Notice of Reasons for Refusal" (Office Action), dated Aug. 21, 2012, pp. 3-4E and English translation pp. 1-4.
European Patent Office, Brief Communication dated Dec. 27, 2010, 14 pages.
Communication dated Apr. 19, 2017 from the State Intellectual Property Office of the P.R.C. in counterpart Application No. 2013107221496.
Lowell Klepper, "A Mode of Action of Herbicides: Inhibition of the Normal Process of Nitrite Reduction", Historical Research Bulletins of the Nebraska Agricultural Experiment Station (1913-1993). 201., Feb. 1974, 45 pages total.
Muhammad Aslam, et al., "Role of Nitrate and Nitrite in the Induction of Nitrite Reductase in Leaves of Barley Seedings", Plant Physiol., 1989, vol. 91, pp. 1152-1156.
Emelia E. Timpo, et al., "Expression of Nitrate and Nitrite Reductase Activities under Various Forms of Nitrogen in *Phaseolus vulgaris* L.", Plant Physiol., 1983, vol. 72, pp. 71-75.
Lin et al., "Changes in the Nitrate and Nitrite Contents of Fresh Vegetables During Cultivation and Post-Harvest Storage," Food and Cosmetics Toxicology; vol. 18, Issue 6, 1980. (pp. 597-603).
Loomis Jr., "What do Plant Enzymes do?" Food Enzyme Institute, Copyright 1988-2017. (1 page total).
Ramarao et al., "Inactivation of Nitrate Reductase from Wheat and Rice Leaves," Phytochemistry, vol. 20, No. 7, 1981. (pp. 1487-1491).
R. Angelotti et al., "Time-Temperature Effects on Salmonellae and Staphylococci in Foods, III. Thermal Death Time Studies", Appl. Microbiol., Oct. 11, 1950, vol. 9, pp. 308-315 (10 pages total).
Gupta, "Food and Industrial Microbiology", Food Preservation, Sep. 17, 2007 (27 pages).
"Survey of Nitrates and Nitrites in Food and Beverages in Australia", Food Standards Australia New Zealand, Nov. 2011 (78 pages).
Whittington, "Fermentation Broth Clarification Techniques", Applied Biochemistry and Biotechnology, The Humana Press Inc., vol. 23, 1990 (31 pages).
De Boer, "The Use of Nitrates and Nitrites in Meat Curing and Preservation: An Abstract of a Thesis submitted in partial fulfillment of the requirements for the degree of doctor of philosophy in bacteriology in the graduate school of The University of Illinois", 1941 (6 pages).
Notice of Grounds for the Decision of the Opposition Division dated Dec. 19, 2018, issued by the European Patent Office in application No. EP 08770585.1.
Bahadoran, et al., "Nitrate and nitrite content of vegetables, fruits, grains, legumes, dairy products, meats and processed meats", Journal of Food Composition and Analysis 51, 2016 (pp. 93-105).
Renix, "Evaluation of the Thermal Inactivation Kinetics of Surrogate Vegetative Bacteria", Masters Theses, University of Tennessee, Trace: Tennessee Research and Creative Exchange, 2015 (54 pages).
"What is Bacillus subtilis natto?", Japanese Natto Kinase Association, 2017 (2 pages) http://i-nattokinase.org/en/inkna_nattou_02.html.
Alexander, Jan, et al., Nitrate in vegetables, Scientific Opinion of the Panel on Contaminants in the Food chain, The EFSA Journal (2008) 689, 1-79.
Machine Translation of Notice of Reasons for Refusal dated Jan. 15, 2019 from the Japanese Patent Office in application No. 214185/2017.

* cited by examiner

_US 11,071,304 B2_

METHOD AND COMPOSITION FOR PREPARING CURED MEAT PRODUCTS

BACKGROUND OF THE INVENTION

The preservation of meat and meat products has been practiced for many years in a variety of ways, such as by smoking, treatment with salt or nitrite, or combinations thereof. In one method for preparing cured meat and meat products, the meat or meat product desired to be cured is exposed to a nitrate-containing substance. Bacteria or other organisms that are capable of converting the nitrate to nitrite are then added to the mixture of the meat or meat product to be cured and the nitrate-containing substance to ferment the nitrate to nitrite. The presence of nitrite gives the meat a distinct color and flavor, in addition to preventing the growth of harmful microorganisms. The curing processes described in the prior art present several problems. The number and sensitivity of the steps involved in such curing processes leads to variable curing of the meat, resulting in an inconsistent product. In addition, the process of converting nitrate to nitrite using bacteria or another organism requires additional processing time, thus slowing the prior art processes. There is need in the art for a commercially viable process for preserving or curing meat and meat products which does not include the introduction into the meat curing process of a nitrate-containing substance and bacteria or other organisms for the conversion of nitrate to nitrite by fermentation, and thus which eliminates the problems outlined above.

BRIEF SUMMARY OF THE INVENTION

The invention provides a curing agent comprising a plant-based nitrite derived from plant material comprising nitrate. The curing agent is capable of curing a meat or meat product and can be prepared outside the meat curing process so as to eliminate the need to introduce bacteria or other organisms along with a nitrate-containing substance into the environment sought to be maintained during curing. This simplifies the number of steps involved in the curing process, increases the speed at which the process occurs, and generally results in a more consistent product.

The invention also provides a process for preparing a curing agent comprising (i) selecting a plant material comprising nitrate, (ii) contacting the plant material with an organism capable of converting said nitrate to nitrite, and (iii) converting a predetermined amount of nitrate to nitrite.

The invention further provides a process for preserving meat or meat product comprising contacting meat or meat product with a curing agent comprising plant-based nitrite, wherein the plant-based nitrite is derived from plant material comprising nitrate, by contacting the plant-based nitrite with the meat or meat product, wherein the meat or meat product is preserved.

The invention also provides a cured meat or meat product, cured by exposing or treating uncured meat or meat product to a curing agent comprising plant-based nitrite. The curing agent of the present invention comprises a sufficient amount of nitrite to cure meat or meat product upon exposure to the curing agent. Similarly, the curing agent comprises plant-based nitrite derived from plant material comprising a sufficient amount of nitrate such that when the plant material is exposed to bacteria or other organism capable of converting nitrate to nitrite, the curing agent has a sufficient amount of nitrate to be effective to cure meat or meat product.

DETAILED DESCRIPTION OF THE INVENTION

In accordance with the invention a curing agent comprising plant-based nitrite derived from plant material comprising nitrate is provided. The curing agent comprises an amount of nitrite such that the curing agent is capable of curing meat or meat product.

The terms meat and meat product, as they relate to the invention described herein, mean any edible tissue or flesh derived from the taxon of organisms that fall within the Kingdom Animalia, including all red meats, pork, poultry, fish, wild game, and combinations thereof.

The curing agent comprises plant-based nitrite and can be derived from any nitrate-containing plant material including, for example, plant extracts, plant juices, plant powders, or any plant derivative which contains nitrate, preferably at least about 50 ppm nitrate. Suitable plant materials include, but are not limited to, celery, beet, spinach, lettuce, cabbage, cucumber, eggplant, mushroom, green pepper, butternut squash, zucchini, mixed salad greens, carrot, artichoke, green bean, lima bean, broccoli, cauliflower, collard green, corn, mustard, okra, onion, Chinese pea pod, black eyed pea, green pea, potato, turnip, sauerkraut, radish and the like. Other edible plant material containing nitrate, preferably at least about 50 ppm nitrate, also can be used. Any mixture or combination of plant materials can be used to make the curing agent. Suitable plant material is available from commercial suppliers such as Florida Food Products, Inc. and Vegetable Juices, Inc. The plant material can be processed in any of a number of ways which are known to those of ordinary skill in the art, such as by low temperature concentration, blending, filtration, pasteurization, and vacuum drying. Aqueous liquid plant material, concentrates or dry powder can be used to make the curing agent.

The nitrate concentration of the plant material used to make the curing agent is preferably at least 50 ppm; plant material with higher nitrate concentrations are also useful. Thus, for example, the nitrate concentration of the plant material is at least about 100 ppm (e.g., at least about 200 ppm, at least about 300 ppm, at least about 400 ppm, at least about 500 ppm, at least about 600 ppm, or at least about 700 ppm). The nitrate concentration of the plant material is preferably about 24,000 ppm or less (e.g., about 20,000 ppm or less, about 15,000 ppm or less, about 10,000 ppm or less, about 8000 ppm or less, about 5000 ppm or less, about 3000 ppm or less, about 2500 ppm or less, or about 2000 ppm or less). Preferably, the nitrate concentration of the plant material is, for example, about 100 ppm to about 10,000 ppm, about 100 ppm to about 5000 ppm, about 200 ppm to about 5000 ppm, about 300 ppm to about 3000 ppm, about 400 ppm to about 1000 ppm, about 50 ppm to about 3000 ppm, or about 100 ppm to about 2500 ppm.

In keeping with the invention, at least a portion of the nitrate naturally occurring in the plant material is converted to nitrite to form the curing agent. It is not necessary nor, in the preferred embodiment of this invention, is it desirable, to add either nitrate or nitrite to the plant material. Thus, the curing agent is, particularly in the preferred embodiments, substantially free of non-natural nitrate and nitrite. The term non-natural nitrate or nitrite, as it relates to the invention described herein, means any nitrate or nitrite which is artificially added to the plant material and thus is not naturally contained within the plant material.

The curing agent can further comprise additional components, including but not limited to, yeast extract, protein hydrolyzates, amino acids, vitamins, minerals, and carbohydrates. Prior to the conversion of nitrate to nitrite, the pH and salt content of the plant material can be adjusted with the addition of a suitable acid, base, salt, or combination thereof. The plant material can be subjected to additional processing steps prior to conversion of nitrate to nitrite. Such processing steps can include, but are not limited to, heat treatment, filter sterilization, or a process which reduces the initial microbial load.

The invention also provides a process for preparing a curing agent comprising (i) selecting a plant material comprising nitrate, preferably at least about 50 ppm nitrate, (ii) contacting the plant material with an organism capable of converting nitrate to nitrite, and (iii) converting a predetermined amount of nitrate to nitrite.

Any organism capable of converting nitrate to nitrite can be used in the process of the present invention. Any organism possessing nitrate reductases or other enzymes capable of converting of nitrate to nitrite can be used. Such organisms can include both food grade and non-food grade organisms. Suitable organisms include but are not limited to yeast, fungi, and bacteria. The organism can be, for example, *E. coli, Rhodobacter sphaeroides, Paracoccus pantotrophus, Wautersia eutropha, Bradyrhizobium japonicum,* any *Pseudomonas* species, *Campylobacter jejunii, Wollinella succinogenes, Haemophylus influenzae, Shewanella oneidensis, Desulfitobacterium hafniense, Rhodobacter capsulatus, Klebsiella pneumoniae, Bacillus subtilis,* the genus *Cyanobacteria,* any *Synechococcus* species, the genus *Haloferax,* the genus *Haloarcula,* and *Thermus thermophilus.* Preferably, the organism is a single strain or combination of bacterial strains within the Micrococcaceae family, including *Micrococcus* and *Staphylococcus,* Gram-positive cocci, including *Enterococcus, Lactococcus, Leuconostoc, Pediococcus, Streptococcus,* and *Staphylococcus,* and all lactic acid bacteria. Examples of the organism or organisms useful in the process of the invention include *M. varians, S. carnosus,* or a combination thereof. It is believed that the organism interacts with the nitrate in the plant material to reduce the plant-based nitrate to nitrite (e.g., by fermentation, metabolic, and/or enzymatic activity).

The nitrate to nitrite conversion process can occur under any suitable parameters. The pH is any pH at which sufficient conversion of nitrate to nitrite occurs. The pH is preferably at least about 5 (e.g., at least about 5.5, at least about 6, at least about 6.5, at least about 7, or at least about 7.5). The pH is preferably about 9 or less (e.g., about 8 or less, about 7 or less, about 6.5 or less, about 6 or less, or about 5.5 or less). The pH is, for example, about 5 to about 9, about 6 to about 8, about 6.5 to about 8, about 6.5 to about 7.5, or about 6.5 to about 7.

The temperature at which the conversion occurs can be any suitable temperature. The temperature at which the conversion occurs is preferably at least about 0° C. (e.g., at least about 15° C., at least about 20° C., at least about 25° C., at least about 30° C., or at least about 35° C.). The temperature at which the conversion occurs is preferably about 50° C. or less (e.g., about 45° C. or less, about 40° C. or less, about 35° C. or less, or about 30° C. or less). The temperature at which the conversion occurs can be, for example, about 0° C. to about 50° C., about 20° C. to about 45° C., about 21° C. to about 43° C., or about 35° C. to about 40° C.

The salt concentration is the salt concentration at which the conversion of nitrate to nitrite occurs. The salt concentration is preferably at least about 0.5 wt. % (e.g., at least about 1 wt. %, at least about 2 wt. %, at least about 3 wt. %, at least about 4 wt. %, or at least about 5 wt. %). The salt concentration is preferably about 8 wt. % or less (e.g., about 6 wt. % or less, about 5 wt. % or less, about 4 wt. % or less, about 3 wt. % or less, about 2 wt. % or less, or about 1 wt. % or less). The salt concentration can be, for example, about 0.1 wt. % to about 8 wt. %, about 0.1 wt. % to about 7 wt. %, about 0.5 wt. % to about 6 wt. %, about 1 wt. % to about 7 wt. %, or about 1 wt. % to about 6 wt. %.

The nitrate to nitrite conversion process can occur under either aerobic or anaerobic aeration conditions, with or without pH control, temperature control, or agitation, until a predetermined level of nitrite is reached. In one embodiment, the conversion process occurs under anaerobic conditions achieved with a nitrogen sparge and low agitation throughout. In another embodiment, the conversion process occurs under anaerobic conditions achieved via low agitation, without a sparge. In another embodiment, the conversion occurs under aerobic conditions achieved with a low air sparge and agitation throughout the conversion process. In another embodiment, the conversion occurs under aerobic conditions achieved with an air sparge and an oxygen sparge, with agitation, wherein levels of 20% dissolved oxygen are maintained throughout the conversion process. In an additional embodiment, the conversion occurs under aerobic conditions achieved initially with a low air sparge with agitation until mid-conversion, at which point an oxygen sparge is added. In a further embodiment, the conversion occurs under aerobic conditions achieved with an air sparge and an oxygen sparge, with agitation, wherein levels of 20% dissolved oxygen are maintained until mid-conversion, at which point the oxygen sparge is removed and the level of agitation is lowered. The nitrite levels can be monitored using techniques such as nitrate depletion, nitrite accumulation, optical density, carbohydrate depletion, or other suitable methods for monitoring fermentation progress, techniques well known to those of ordinary skill in the art.

When the predetermined level of nitrite is reached, the curing agent can be inactivated using methods known to those of ordinary skill in the art. Useful inactivation methods include, but are not limited to, filter sterilization, heat treatment such as pasteurization, sterilization, or centrifugation. When the predetermined level of nitrite is reached, the organism can be inactivated and remain in the curing agent, or inactivated and removed from the curing agent.

The nitrite concentration of the curing agent is a concentration sufficient to cure meat or meat product upon exposure or treatment of uncured meat or meat product to the nitrite-containing curing agent. The curing agent can be concentrated and/or dried after processing of the curing agent is complete by using methods which are known to those of ordinary skill in the art. Similarly, the concentrated curing agent can be diluted before it contacts the meat or meat product by using methods which are known to those of ordinary skill in the art. The nitrite concentration of the concentrated curing agent can be any suitable concentration. The nitrite concentration of the curing agent is preferably at least about 50 ppm (e.g., at least about 100 ppm, at least about 200 ppm, at least about 300 ppm, at least about 400 ppm, at least about 500 ppm, or at least about 600 ppm). The nitrite concentration of the curing agent is preferably about 24,000 ppm or less (e.g., about 20,000 ppm or less, about 15,000 ppm or less, about 10,000 ppm or less, about 8000 ppm or less, about 5000 ppm or less, about 3000 ppm or less, or about 2000 ppm or less). The nitrite concentration of the curing agent can be, for example, about 50 ppm to about 24,000 ppm, about 100 ppm to about 10,000 ppm, about 200 ppm to about 8000 ppm, about 300 ppm to about 6000 ppm, about 400 ppm to about 5000 ppm, or about 500 ppm to about 1000 ppm.

The invention provides a process for preserving meat or meat product comprising contacting the meat or meat product with a curing agent comprising plant-based nitrite. The plant-based nitrite is derived from plant material comprising nitrate in an amount sufficient to cure the uncured meat or meat product upon exposure to or treatment with the curing agent. Preferably the curing agent comprises at least about 50 ppm nitrite.

The invention also provides a cured meat or meat product, wherein the meat or meat product has been treated with a curing agent comprising plant-based nitrite and the plant-based nitrite is derived from plant material comprising nitrate, preferably at least about 50 ppm nitrate.

The terms preserving, preserve(d), curing, and cure(d), as they relate to the invention described within, mean any improvement in the amount of time that meat or meat product treated with the curing agent can be safely stored (e.g., shelf-life), or remains sensory, organoleptic, or color-acceptable, when compared with meat or meat products that have not been cooked, cured, preserved, or treated with any shelf-life extending agent, such as salt or smoke.

The curing agent of the present invention can be used to cure any of a wide variety of uncured meat or meat product that it is desired to cure. Uncured meat or meat product that can be cured with the curing agent of the present invention include, but are not limited to, whole muscle meats, emulsified meats, and the like. Cured meat or meat products include, for example, ham, turkey, chicken, hot dogs, lunch meat, bacon and the like.

The nitrite concentration of the curing agent which contacts the meat or meat product can be any suitable concentration. The nitrite concentration of the curing agent which contacts the meat or meat product can be at least about 10 ppm (e.g., at least about 30 ppm, at least about 50 ppm, at least about 75 ppm, at least about 100 ppm, or at least about 125 ppm). The nitrite concentration of the curing agent which contacts the meat or meat product can be about 300 ppm or less (e.g., about 250 ppm or less, about 200 ppm or less, about 175 ppm or less, about 156 ppm or less, or about 125 ppm or less). The nitrite concentration of the curing agent which contacts the meat or meat product can be, for example, about 10 ppm to about 300 ppm, about 20 ppm to about 275 ppm, about 30 ppm to about 250 ppm, about 40 ppm to about 220 ppm, or about 50 ppm to about 200 ppm.

The following examples further illustrate the invention but, of course, should not be construed as in any way limiting its scope.

EXAMPLE 1

This example illustrates the effect of fermentation on the nitrate to nitrite conversion levels of various sources of plant material.

The source of plant material used in each of the compositions is indicated below in Table 1. Each composition contained the juice concentrate specified in Table 1 that was diluted 1:10 in de-ionized water to which 0.3 wt. % yeast extract was added. The pH of each composition was adjusted to 7 with 50% sodium hydroxide. The compositions were sterilized at 121° C. for 15 minutes. Each composition was then inoculated with *M. varians* and placed in a shaker at 200 rpm and incubated at 31° C. for 8-20 hours.

The nitrite concentration (ppm) was determined before and after fermentation for each composition, and the results are shown in Table 1.

TABLE 1

| Vegetable Source | Nitrite Conc. Before Fermentation (ppm) | Nitrite Conc. After Fermentation (ppm) |
|---|---|---|
| Cabbage | 0 | 280 |
| Bell Pepper | 0 | 13 |
| Beet | 0 | 724 |
| Celery | 0 | 1086 |

The data presented in Table 1 show that the fermentation process increased the nitrite levels in each type of plant material examined.

EXAMPLE 2

This example illustrates the effect of sodium chloride used during the fermentation process on the nitrate to nitrite conversion levels of a plant material.

The strain of bacteria and amount of sodium chloride used in each of the compositions are indicated below in Table 2. Each composition contained celery juice concentrate that was diluted 1:10 in de-ionized water to which 0.3 wt. % yeast extract was added. The pH of each composition was adjusted to 7 with 50% sodium hydroxide. The compositions were sterilized at 121° C. for 15 minutes. Each composition was then inoculated with either *M. varians* or *S. carnosus* and placed in a shaker at 200 rpm and incubated at 31° C. for 8-20 hours.

The nitrite concentration (ppm) was determined after fermentation for each composition, and the results are shown in Table 2.

TABLE 2

| NaCl Conc. (wt. %) | *M. varians* Nitrite Conc. (ppm) | *S. carnosus* Nitrite Conc. (ppm) |
|---|---|---|
| 0 | 1086 | 724 |
| 5 | 767 | 382 |
| 7.50 | 28 | 17 |
| 10 | 0 | 0 |
| 12.50 | 0 | 0 |
| 15 | 0 | 0 |

The data presented in Table 2 show that a sodium chloride concentration of 10% or above inhibits the formation of any nitrite in compositions containing either strain of bacteria.

EXAMPLE 3

This example illustrates the effect of temperature used during the fermentation process on the nitrate to nitrite conversion levels of a plant material.

The temperature level and strain of bacteria used in each of the compositions is indicated below in Table 3. Each composition contained celery juice concentrate that was diluted 1:10 in de-ionized water to which 0.3 wt. % yeast extract was added. The pH of each composition was adjusted to 7 with 50% sodium hydroxide. The compositions were sterilized at 121° C. for 15 minutes. Each composition was then inoculated with either *M. varians* or *S. carnosus* and placed in a shaker at 200 rpm and incubated at the temperature indicated in Table 3 for 8-20 hours.

The nitrite concentration (ppm) was determined after fermentation for each composition, and the results are shown in Table 3.

TABLE 3

| Temperature | M. varians Nitrite Conc. (ppm) | S. carnosus Nitrite Conc. (ppm) |
|---|---|---|
| 4.4° C. | 8 | 0 |
| 22.2° C. | 1020 | 102 |
| 37.8° C. | 1086 | 724 |
| 40.6° C. | 767 | 576 |
| 43.3° C. | 855 | 428 |
| 46.1° C. | 9 | 82 |
| 48.9° C. | 0 | 0 |

The data presented in Table 3 show that a temperature of 22.2° C.-43.3° C. increased the amount of nitrite production from plant material that was fermented with either strain of bacteria.

EXAMPLE 4

This example illustrates the effect of pH used during the fermentation process on the nitrate to nitrite conversion levels of a plant material.

The pH and cell count at 0 hours and 20 hours are indicated below in Table 4. Each composition contained celery juice concentrate that was diluted 1:10 in de-ionized water to which 0.3 wt. % yeast extract was added. The compositions were sterilized at 121° C. for 15 minutes. Each composition was then inoculated with M. varians and placed in a shaker at 200 rpm and incubated at 31° C. for 20 hours.

The nitrite concentration (g/L) was determined before and after 20 hours of fermentation for each composition, and the results are shown in Table 4.

TABLE 4

| PH | Cell Count, 0 hrs. Incubation (cfu/ml) | Cell Count, 20 hrs. Incubation (cfu/ml) | Nitrite Conc., 0 hrs. Incubation (mg/L) | Nitrite Conc., 20 hrs. Incubation (mg/L) |
|---|---|---|---|---|
| 5 | 6.7E+07 | 1.2E+08 | 0 | 500 |
| 5.5 | 6.7E+07 | 4.1E+08 | 0 | 1000 |
| 6 | 6.7E+07 | 8.3E+08 | 0 | 1000 |
| 6.5 | 6.7E+07 | 1.9E+09 | 0 | 1500 |
| 7 | 6.7E+07 | 3.2E+09 | 0 | 1500 |
| 7.5 | 6.7E+07 | 2.8E+09 | 0 | 1500 |
| 8 | 6.7E+07 | 1.7E+09 | 0 | 1500 |

The data presented in Table 4 show that a pH of 6.5-8 increased the amount of nitrite production in plant material that was examined.

EXAMPLE 5

This example illustrates the effect of the aeration conditions used during the fermentation process on the nitrate to nitrite conversion levels of a plant material.

The aeration conditions and incubation time of each composition are indicated below in Table 5. It should be noted that when the aeration conditions depend on the level of dissolved oxygen, the levels of agitation and aeration vary in order to maintain the desired amount of dissolved oxygen. Each composition contained celery juice concentrate that was diluted 1:10 in de-ionized water to which 0.3 wt. % yeast extract was added. The pH of each composition was adjusted from 6.8 to 6.5 with 50% sodium hydroxide. The compositions were sterilized at 121° C. for 20 minutes. Each composition was then inoculated with M. varians and placed in an incubator at 31° C.

The nitrite concentration (mg/L) was determined after fermentation for each composition, and the results are shown in Table 5.

TABLE 5

| Aeration Conditions | Fermentation Time (hours) | Nitrite Conc. (mg/L) |
|---|---|---|
| Anaerobic w/nitrogen sparge | 13 | 1546 |
| Fermentation w/low agitation only (5%) | 12 | 1250 |
| Aerobic w/low air sparge (5 L/min aeration) and low agitation (5%) | 13 | 1382 |
| Aerobic w/air sparge, oxygen sparge, and low agitation (5%), wherein levels of 20% dissolved oxygen were maintained | 11 | 724 |
| Aerobic w/low air sparge (5 L/min aeration) and low agitation (5%) until mid-fermentation, wherein an oxygen sparge was added and conditions were changed to maintaining levels of 20% dissolved oxygen | 12.5 | 1020 |
| Aerobic w/air sparge, oxygen sparge, and low agitation (5%), wherein levels of 20% dissolved oxygen were maintained until mid-fermentation, wherein conditions were changed to a low air sparge (5 L/min) with low agitation | 12.5 | 1382 |

The data presented in Table 5 show that anaerobic conditions, aerobic conditions, or various combinations of such all enabled conversion of nitrate to nitrite in the plant material that was examined.

EXAMPLE 6

This example illustrates the use of the curing agent in the preparation of a cured ham product.

Each composition contained celery juice concentrate was diluted to 4.3% solids. 0.3 wt. % yeast extract was added to the composition, which was then inoculated with M. varians. The pH of the composition was adjusted from 6.8 to 6.5 with sodium hydroxide. A temperature of 31° C. and an agitation level of 10% were maintained throughout the fermentation process. After 6 hours of fermentation, a 5 SCFM air sparge was added. The fermentation continued until base addition flatlined. After fermentation was completed, the pH of the composition was adjusted to 7.5 with sodium hydroxide. The fermentate temperature was brought to 95° C. for 20 minutes, then the fermentate was concentrated to 46% solids. The fermentate was then autoclaved at 121° C. for 15 minutes. The resulting curing agent contained approximately 5000 ppm nitrite, which corresponds to approximately 7500 ppm sodium nitrite.

The curing agent was formulated in 40% extended hams from Swift & Company (NAMP 402F, pork leg (fresh ham), inside) at concentrations of 75 ppm, 150 ppm, and 200 ppm sodium nitrite, which corresponds to 50 ppm, 100 ppm, and 133 ppm nitrite per meat green weight, respectively. Meat green weight is the weight of the raw meat before the addition of other components or cooking, thus a 40% extended ham contains 40 wt. % non-meat ingredients. In addition, an uncured ham and a ham to which 200 ppm sodium nitrite was directly added served as controls. It should be noted that all nitrite concentrations listed in Tables 6-8 are calculated as ppm sodium nitrite.

The five different formulations examined are indicated below in Table 6.

TABLE 6

| Ingredient | Uncured Control | Nitrite Control (200 ppm) | Curing Agent (75 ppm Nitrite) | Curing Agent (150 ppm Nitrite) | Curing Agent (200 ppm Nitrite) |
|---|---|---|---|---|---|
| Pork, inside rounds (%) | 100 | 100 | 100 | 100 | 100 |
| Water/Ice (%) | 35.82 | 35.50 | 34.82 | 33.82 | 33.15 |
| Salt (%) | 2.10 | 2.10 | 2.10 | 2.10 | 2.10 |
| Sodium tripolyphosphate (%) | 0.63 | 0.63 | 0.63 | 0.63 | 0.63 |
| Dextrose (%) | 1.40 | 1.40 | 1.40 | 1.40 | 1.40 |
| Curing salt containing 6.25 wt. % sodium nitrite (%) | — | 0.32 | — | — | — |
| Sodium erythorbate (%) | 0.05 | 0.05 | 0.05 | 0.05 | 0.05 |
| Curing agent (%) | | | 1.00 | 2.00 | 2.67 |
| Total (%) | 140 | 140 | 140 | 140 | 140 |

A brine was prepared by mixing water and ice, sodium tripolyphosphate, salt, the curing agent or sodium nitrite, dextrose, and sodium erythorbate at the concentrations listed in Table 6. The pork was then injected with 40% of the brine and vacuum tumbled for 2 hours at 8 rpm. The product was held overnight under refrigeration at 2.7° C. The product was then tumbled for 15-30 minutes, packaged in heat shrink vacuum bags, and cooked at 100% humidity in a smokehouse for 1 hour at 48.9° C., 1 hour at 60° C., 1 hour at 71° C., and at 82° C. until it reached an internal temperature of 71° C. The product was then showered until the temperature dropped below 37.8° C. and was stored under refrigeration at 2.7° C. Yield and color measurements were then taken.

The percent yield of each of the five different formulations examined is indicated below in Table 7. As is apparent from the data presented, the addition of the curing agent neither significantly ($p > 0.05$) increased nor decreased the final yield of the product.

TABLE 7

| Nitrite Additive | % Yield |
|---|---|
| Uncured Control | 94.7 |
| Nitrite Control (200 ppm) | 92.7 |
| Curing Agent (75 ppm Nitrite) | 93.4 |
| Curing Agent (150 ppm Nitrite) | 93.2 |
| Curing Agent (200 ppm Nitrite) | 92.6 |

The color of slices of the treated ham product was also measured using a Minolta Chroma-meter (CR-300), wherein L* (100=white, 0=black), a* (+60=red, −60=green), and b* (+60=yellow, −60=blue) were measured and are listed below in Table 8. The a* values indicated that both the nitrite control ham product and the curing agent treated ham product appeared more red or pink in color when compared with the uncured sample. This was expected, as meat products that have been treated with nitrite typically have a red/pink appearance when compared with untreated meat products. The differences in color between the hams treated with the three different concentrations of curing agent were minimal.

TABLE 8

| Nitrite Additive | L* | a* | b* |
|---|---|---|---|
| Uncured Control | 71.68 | 5.85 | 10.12 |
| Nitrite Control (200 ppm) | 70.24 | 10.32 | 5.93 |
| Curing Agent (75 ppm Nitrite) | 66.29 | 11.28 | 7.45 |
| Curing Agent (150 ppm Nitrite) | 63.39 | 10.82 | 7.64 |
| Curing Agent (200 ppm Nitrite) | 64.28 | 9.25 | 7.42 |

EXAMPLE 7

This example illustrates the use of the curing agent in the preparation of a cured hot dog product.

Each composition contained celery juice concentrate was diluted to 4.3% solids. 0.3 wt. % yeast extract was added to the composition, which was then inoculated with *M. varians*. The pH of the composition was adjusted from 6.8 to 6.5 with sodium hydroxide. A temperature of 31° C. and an agitation level of 10% were maintained throughout the fermentation process. After 6 hours of fermentation, a 5 SCFM air sparge was added. The fermentation continued until base addition flatlined. After fermentation was completed, the pH of the composition was adjusted to 7.5 with sodium hydroxide. The fermentate temperature was brought to 95° C. for 20 minutes, then the fermentate was concentrated to 46% solids. The fermentate was then autoclaved at 121° C. for 15 minutes. The resulting curing agent contained approximately 5000 ppm nitrite, which corresponds to approximately 7500 ppm sodium nitrite.

The curing agent was formulated in a meat block from Amity Packing Company ((NAMP 402F, pork leg (fresh ham) and NAMP 418, pork trimmings) comprising 56% lean pork, 31% 80/20 pork trimmings, and 13% 50/50 pork trimmings at concentrations of 75 ppm and 156 ppm sodium nitrite, which corresponds to 50 ppm and 104 ppm nitrite per meat green weight, respectively. The meat green weight is the weight of the raw meat before the addition of other components or cooking. In addition, an untreated hot dog and a hot dog to which 156 ppm sodium nitrite was directly added served as controls. It should be noted that all nitrite concentrations listed in Tables 9-11 are calculated as ppm sodium nitrite.

The four different formulations examined are indicated below in Table 9.

TABLE 9

| Ingredient | Uncured Control | Nitrite Control (156 ppm) | Curing Agent (75 ppm Nitrite) | Curing Agent (156 ppm Nitrite) |
|---|---|---|---|---|
| Meat block (%) | 100 | 100 | 100 | 100 |
| Water/Ice (%) | 20.83 | 20.58 | 19.83 | 18.75 |
| Salt (%) | 2.50 | 2.50 | 2.50 | 2.50 |
| Sodium tripolyphosphate (%) | 0.37 | 0.37 | 0.37 | 0.37 |
| Dextrose (%) | 1.25 | 1.25 | 1.25 | 1.25 |
| Curing salt containing 6.25 wt. % sodium nitrite | — | 0.25 | — | — |
| Sodium erythorbate (%) | 0.05 | 0.05 | 0.05 | 0.05 |
| Curing agent (%) | — | — | 1.00 | 2.08 |
| Total | 125 | 125 | 125 | 125 |

The meat was pre-ground or chopped and placed in a bowl chopper with the sodium tripolyphosphate, salt, sodium nitrite or curing agent, and half of the water and ice, at the concentrations listed in Table 9. The product was chopped under a vacuum for approximately 3 minutes until an even batter is formed. The remaining water and ice, pork, and additional ingredients (see Table 9) were added to the mixture. The product was mixed until a fine batter was formed. The product was then vacuum stuffed into 28 mm diameter cellulose casings. The product was cooked for 15 min at 48.9° C./−17.8° C. (dry bulb/wet bulb), 45 min at 62.8° C./43.3° C., 10 min at 65.5° C./44.4° C., 10 min at 73.9° C./54.4° C., 10 min at 79.4° C./62.8° C., and 4 min at 82.2° C./76.7° C., resulting in a 71° C. internal temperature of the product, which was then followed by a 10 minute shower. The product was cooled and the percent yields and color measurements were taken.

The percent yield of each of the four different formulations examined is indicated below in Table 10. As is apparent from the data presented, the addition of the curing agent neither significantly increased nor decreased the final yield of the product.

TABLE 10

| Nitrite Additive | % Yield |
|---|---|
| Uncured Control | 90.7 |
| Nitrite Control (156 ppm) | 88.8 |
| Curing Agent (75 ppm Nitrite) | 89.5 |
| Curing Agent (156 ppm Nitrite) | 91.1 |

The color of slices of the treated hot dog product was also measured using a Minolta Chroma-meter (CR-300), wherein L* (100=white, 0=black), a* (+60=red, −60=green), and b* (+60=yellow, −60=blue) were measured and are listed below in Table 11. The a* values indicated that both the nitrite control hot dog product and the curing agent treated hot dog product appeared more red or pink in color when compared with the uncured sample. This was expected, as meat products that have been treated with nitrite typically have a red/pink appearance when compared with untreated meat products. The differences in color between the hot dog products treated with the two different concentrations of curing agent were minimal.

TABLE 11

| Nitrite Additive | L* | a* | b* |
|---|---|---|---|
| Uncured Control | 69.40 | 4.00 | 10.71 |
| Nitrite Control (156 ppm) | 71.55 | 10.83 | 8.70 |
| Curing Agent (75 ppm Nitrite) | 68.80 | 9.73 | 9.12 |
| Curing Agent (156 ppm Nitrite) | 68.27 | 10.64 | 10.13 |

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, including the best mode known to the inventors for carrying out the invention. Variations of the preferred embodiments may become apparent to those of ordinary skill in the art upon reading the foregoing description. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A process for preserving a meat or meat product comprising
    contacting the meat or meat product to be preserved with a curing agent comprising a plant-based nitrite and an added organism, the plant-based nitrite being derived from a plant material comprising at least about 50 ppm nitrate and the organism, wherein the plant material is heat treated prior to addition of the organism so as to have a reduced microbial load relative to a naturally occurring microbial load of the plant material, the organism inactivated, wherein the organism was capable of converting nitrate to nitrite before the inactivation, and
    preserving the contacted meat or meat product.

2. The process of claim 1, wherein the curing agent is concentrated before it contacts the meat or meat products.

3. The process of claim 1, wherein the plant-based nitrite is present in the curing agent in an amount of about 50 ppm to about 200 ppm.

4. The process of claim 1, wherein the curing agent is substantially free of non-natural nitrate and nitrite.

5. A cured meat or meat product, the meat or meat product having been treated with a curing agent comprising plant-based nitrite and an added organism, the plant-based nitrite being derived from a plant material comprising at least about 50 ppm nitrate and the organism, wherein the plant material is heat treated prior to addition of the organism so as to have a reduced microbial load relative to a naturally occurring microbial load of the plant material, the organism inactivated, wherein the organism was capable of converting nitrate to nitrite before the inactivation.

* * * * *